United States Patent
Misumi

(10) Patent No.: US 9,688,118 B2
(45) Date of Patent: Jun. 27, 2017

(54) AIR CONDITIONER FOR VEHICLE

(75) Inventor: Haruki Misumi, Higashihiroshima (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 681 days.

(21) Appl. No.: 13/331,272

(22) Filed: Dec. 20, 2011

(65) Prior Publication Data

US 2012/0160470 A1 Jun. 28, 2012

(30) Foreign Application Priority Data

Dec. 23, 2010 (JP) ................................. 2010-286812

(51) Int. Cl.
  *F25D 21/00* (2006.01)
  *B60H 3/00* (2006.01)
  *B60H 1/32* (2006.01)

(52) U.S. Cl.
  CPC ......... *B60H 3/0085* (2013.01); *B60H 1/3207* (2013.01); *B60H 2001/3245* (2013.01)

(58) Field of Classification Search
  CPC ...... F25D 21/14; F25D 21/002; F25D 17/042; B60H 1/3207; F24F 11/0015; F24F 3/153
  See application file for complete search history.

(56) References Cited

U.S. PATENT DOCUMENTS

| | | | |
|---|---|---|---|
| 6,035,649 A | * | 3/2000 | Straub ................. B60H 1/3207 236/44 A |
| 6,145,325 A | | 11/2000 | Hanselmann et al. |
| 6,470,697 B2 | * | 10/2002 | Nakamura et al. ............. 62/157 |
| 7,857,235 B2 | * | 12/2010 | Matsui et al. ............. 236/44 A |

(Continued)

FOREIGN PATENT DOCUMENTS

| | | |
|---|---|---|
| EP | 1 422 084 | 5/2004 |
| JP | H07132731 A * | 5/1995 |
| JP | 2000-001121 | 1/2000 |

(Continued)

OTHER PUBLICATIONS

Hiroyuki et al., Air Conditioner for Vehicle, Jun. 1, 2006, JP2006137271A, Whole Document.*

(Continued)

*Primary Examiner* — Larry Furdge
(74) *Attorney, Agent, or Firm* — Harness, Dickey & Pierce, P.L.C.

(57) ABSTRACT

An air conditioner for a vehicle includes a casing, a cooling heat exchanger, a cooling temperature adjusting portion, a dew-point detector, a target temperature determining portion, and a cooling temperature control portion. The cooling heat exchanger is arranged in the casing to cool air to be blown into a vehicle compartment. The cooling temperature adjusting portion adjusts a cooling temperature of air cooled at the cooling heat exchanger such that the cooling temperature approaches a target cooling temperature of the cooling heat exchanger. The dew-point detector detects a dew-point temperature of air flowing to the cooling heat exchanger. The target temperature determining portion determines the target cooling temperature to be a first target temperature lower than the dew-point temperature by a standard degree, and temporarily to be a second target temperature lower than the first target temperature.

12 Claims, 4 Drawing Sheets

(56) References Cited

U.S. PATENT DOCUMENTS

2001/0049943 A1* 12/2001 Nakamura ........... B60H 1/3207
62/176.6
2007/0221371 A1* 9/2007 Ichikawa ........... B60H 1/00785
165/204

FOREIGN PATENT DOCUMENTS

| | | | |
|---|---|---|---|
| JP | 2004-175149 | | 6/2004 |
| JP | 2006137271 A | * | 6/2006 |
| JP | 2007-022311 | | 2/2007 |
| JP | 2008232511 A | * | 10/2008 |
| JP | 2010125979 A | * | 6/2010 |
| WO | WO 00/07836 | | 2/2000 |

OTHER PUBLICATIONS

Hirokuni et al., Refrigerating Air-Conditioning Device and Method, Oct. 2, 2008, JP2008232511A, Whole Document.*
Katsuki et al., Air Conditioner for Vehicle, May 23, 2016, JPH07132731A, Whole Document.*
Kenichi et al., Air Conditioning Device for Vehicle, Jun. 10, 2010, JP2010125979A, Whole Document.*
Office action dated Nov. 26, 2013 in corresponding Japanese Application No. 2010-286812.

* cited by examiner

AIR CONDITIONER FOR VEHICLE

CROSS REFERENCE TO RELATED APPLICATION

This application is based on and incorporates herein by reference Japanese Patent Application No. 2010-286812 filed on Dec. 23, 2010.

TECHNICAL FIELD

The present invention relates to a vehicle air conditioner which is provided with a cooling heat exchanger.

BACKGROUND

Conventionally, Patent Document 1 (International Patent Publication No. WO 0007836 A1) discloses regarding a vehicle air conditioner, which is provided with an evaporator of a refrigerant cycle as a cooling heat exchanger. The cooling heat exchanger is used for cooling air to be blown into a vehicle compartment. The vehicle air conditioner is made to prevent bad odor generation in the blown air at the evaporator.

Specifically, the air conditioner in Patent Document 1 controls a refrigerant discharge capacity of a compressor of the refrigerant cycle, such that an evaporation temperature of refrigerant flowing in the evaporator becomes higher or lower by a predetermined degree than a dew-point temperature of the blown air flowing into the evaporator. Accordingly, an outer surface of the evaporator is not dry and wet frequently. Therefore, bad odor generation in the blown air is prevented.

However, the bad odor generation in the blown air due to the drying of the outer surface of the evaporator may not be prevented just by setting the evaporation temperature of refrigerant flowing in the evaporator to be lower by the predetermined degree than the dew-point temperature of air flowing into the evaporator. For example, when the dew-point temperature of the blown air decreases drastically, or when a water-holding amount of the outer surface of the evaporator is small at a start of air conditioning of the vehicle compartment, the outer surface of the evaporator may become dry, and thereby bad odor may be generated in air to be blown into the vehicle compartment.

In response, it may be considered that the evaporation temperature of refrigerant flowing in the evaporator is made to be much lower than the dew-point temperature of air to be blown into the evaporator. However, in this case, consumed driving power of the compressor increases, and accordingly energy consumed in the whole air conditioner increases.

SUMMARY

The present invention addresses at least one of the above disadvantages.

According to an aspect of the present invention, an air conditioner for a vehicle includes a casing, a cooling heat exchanger, a cooling temperature adjusting portion, a dew-point detector, a target temperature determining portion, and a cooling temperature control portion. The casing defines an air passage through which air to be blown into a vehicle compartment passes. The cooling heat exchanger is arranged in the casing to cool air. The cooling temperature adjusting portion is configured to adjust a cooling temperature of air cooled at the cooling heat exchanger. The dew-point detector is configured to detect a physical amount relevant to dew-point temperature of air flowing to the cooling heat exchanger. The target temperature determining portion is configured to determine a target cooling temperature which is a target temperature of the cooing heat exchanger to be a first target temperature lower than the dew-point temperature by a standard degree. The cooling temperature control portion is configured to control the cooling temperature adjusting portion so that the cooling temperature approaches the target cooling temperature. The target temperature determining portion determines the target cooling temperature to be a second target temperature lower than the first target temperature, temporarily.

Accordingly, bad odor generation in air blown into the vehicle compartment can be prevented with reducing energy consumption of the air conditioner.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE DRAWINGS

Figure 1:
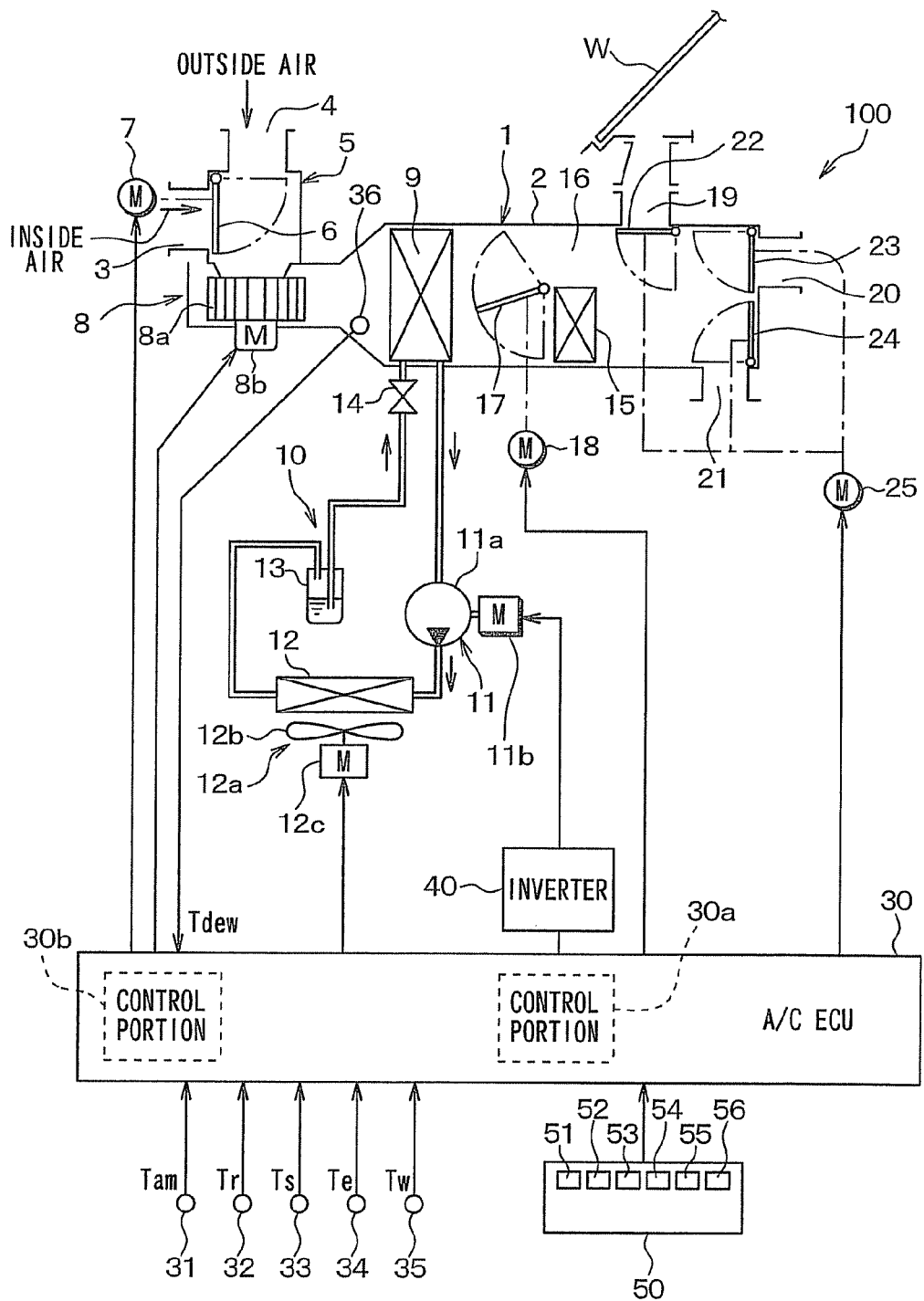
FIG. 1 is a schematic diagram showing an air conditioner for a vehicle, according to a first embodiment of the invention.

Embodiments of the present invention will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment of the invention will be described referring to FIGS. 1 to 4. An air conditioner 100 for a vehicle according to the present embodiment is typically used for a hybrid vehicle which receives a driving force from an internal combustion engine and an electrical motor for driving the vehicle.

A hybrid vehicle can generally switch its running states by actuating or stopping the engine depending on a running load or the like of the vehicle. For example, in one of the running states, driving force is obtained from both of the engine and the electrical motor. In another state, driving force is obtained only from the electrical motor by stopping the engine. Accordingly, the hybrid vehicle can improve its fuel efficiency as compared to a normal vehicle in which driving force is obtained only from an engine.

As shown in FIG. 1, the air conditioner 100 according to the present embodiment includes an air conditioning unit 1, a refrigerant cycle 10, and an air conditioning controller 30 (A/C ECU). The air conditioning unit 1 is arranged inside an instrument panel (dashboard) located at a front end of a vehicle compartment. The air conditioning unit 1 includes a casing 2, a blower 8, an evaporator 9, and a heater core 15. The casing 2 accommodates the blower 8, the evaporator 9, the heater core 15 and the like.

The casing 2 is formed of high-strength resin (e.g., polypropylene) having a certain level of elasticity, and defines an air passage through which air flows into the vehicle compartment. At a most upstream side of the casing 2 in a flow direction of the air, an inside/outside air switching box 5 is arranged. The switching box 5 switches between an outside air introduction passage, which introduces outside air, i.e., air outside of the vehicle compartment into the air passage of the casing 2, and an inside air introduction passage, which introduces inside air, i.e., air inside of the vehicle compartment into the air passage of the casing 2.

Specifically, the switching box 5 includes an inside air port 3 and an outside air port 4, which introduce inside air and outside air to the air passage of the casing 2 respectively. An inside/outside air switching door 6 is disposed inside the switching box 5 to adjust open areas of the inside air port 3 and the outside air port 4 continuously, thereby adjusting a ratio between flow amounts of inside air and outside air to be introduced into the casing 2.

Hence, the switching door 6 is used to selectively switch an air inlet mode by adjusting the ratio between the flow amounts of inside air and outside air introduced into the casing 2. The switching door 6 is actuated by a servomotor 7 that is controlled by a control signal output from the air conditioning controller 30.

The air inlet mode includes an inside air mode, an outside air mode, and an inside/outside air mix mode. In the inside air mode, inside air is introduced into the casing 2 by fully opening the inside air port 3 and fully closing the outside air port 4. In the outside air mode, outside air is introduced into the casing 2 by fully opening the outside air port 4 and fully closing the inside air port 3. In the inside/outside air mix mode, the inside air port 3 and the outside air port 4 are opened simultaneously. The switching box 5 is adopted as an example of an inside/outside air switching portion which switches between the inside air mode, where inside air is introduced to the air passage of the casing 2, and the outside air mode, where outside air is introduced to the air passage of the casing 2.

The blower 8 is located at a downstream side of the switching box 5 in the air flow direction. The blower 8 is adopted as an example of a blowing portion. The blower 8 blows air, which has been introduced through the switching box 5, toward the vehicle compartment. For example, the blower 8 is an electrical blower in which a centrifugal multi-blade fan (e.g., sirocco fan) 8a is driven by an electrical motor 8b, and the rotation speed (air blowing amount) of the electrical motor 8b is controlled by a control voltage output from the air conditioning controller 30. Thus, the electrical motor 8b is adopted as an example of a blowing capacity changing portion of the blower 8.

The evaporator 9 is arranged at a downstream side of the blower 8 in the air flow direction. The evaporator 9 is adopted as an example of a cooling heat exchanger where the air to be blown into the vehicle compartment is cooled by heat exchange with refrigerant flowing therein. Specifically, the evaporator 9 is one component of the refrigerant cycle 10, which includes a compressor 11, a condenser 12, a liquid receiver 13, and an expansion valve 14, in addition to the evaporator 9.

The refrigerant cycle 10 will be described below. The compressor 11 is arranged in an engine compartment of the vehicle to draw and compress refrigerant, and then to discharge the compressed refrigerant. The compressor 11 is an electrical compressor in which a fixed-displacement compression mechanism 11a is driven by an electrical motor 11b. The fixed-displacement compression mechanism 11a is configured to discharge a fixed amount of refrigerant. The electrical motor 11b is an alternate motor, and operation (rotation speed) of the electrical motor 11b is controlled by an alternate current output from an inverter 40.

An alternate current output from the inverter 40 has a frequency in accordance with a control signal output from the air conditioning controller 30. Thus, a rotation speed of the compressor 11 is controlled by a frequency control of the air conditioning controller 30, and thereby, a refrigerant discharge capacity of the compressor 11 is also changed by the frequency control. Therefore, the electrical motor 11b is adopted as a discharge capacity changing portion of the compressor 11.

The condenser 12 is arranged in the engine compartment, and cools and condenses refrigerant which has been discharged from the compressor 11. The condensation is performed by heat exchange between the discharged refrigerant flowing out of the compressor 11 and air (outside air) sent from outside of the vehicle compartment by a cooling blower 12a used as an outdoor fan.

The cooling blower 12a is an electrical fan in which an axial fan 12b is driven by an electrical motor 12c. An operation rate, i.e., a rotation speed (air blowing amount) of the electrical motor 12c is controlled by a control voltage output from the air conditioning controller 30. Thus, the electrical motor 12c is adopted as a blowing capacity changing portion of the cooling blower 12a.

The liquid receiver 13 is a gas-liquid separator, which separates refrigerant cooled and condensed by the condenser 12 into gas and liquid to store surplus refrigerant and to discharge only liquid refrigerant downstream. The expansion valve 14 is adopted as an example of a decompression portion which decompresses and expands refrigerant flowing out of the liquid receiver 13. For example, the expansion valve 14 is a thermostatic expansion valve, which regulates a refrigerant amount to be discharged downstream, so that a superheat degree of refrigerant flowing at an outlet of the evaporator 9 is adjusted within a predetermined range.

As the above-described thermostatic expansion valve 14, an expansion valve can be adopted, which includes a temperature sensor located in a refrigerant passage of the outlet of the evaporator 9. The expansion valve 14 detects a superheat degree of refrigerant at the outlet of the evaporator 9 based on a temperature and a pressure of the refrigerant. The expansion valve 14 regulates its open degree (refrigerant amount) by an automatic mechanism such that a superheat degree of refrigerant at the outlet of the evaporator 9 becomes a predetermined value.

Refrigerant, which has been decompressed and expanded at the expansion valve 14, evaporates and exerts its heat absorption effect at the evaporator 9. Accordingly, the evaporator 9 functions as a cooling heat exchanger which cools the blown air. A cooling temperature Te of air flowing out of an air outlet of the evaporator 9 is determined based on an evaporation temperature (evaporation pressure) of refrigerant flowing in the evaporator 9.

Furthermore, in the present embodiment, the thermostatic expansion valve 14, which regulates its open degree by an automatic mechanism, is adopted as the decompression portion. Thus, an evaporation pressure of refrigerant flowing in the evaporator 9 can be determined based on a rotational speed (refrigerant discharge capacity) of the compressor 11. Therefore, the compressor 11 of the present embodiment is adopted as an example of a cooling temperature adjusting portion which adjusts the cooling temperature Te of the air flowing out of the evaporator 9.

The heater core 15 is arranged at a downstream side of the evaporator 9 in the casing 2 in the air flow direction, to heat air passing through the heater core 15 in the casing 2. The heater core 15 is adopted as a heating heat exchanger. The heating heat exchanger heats air (cold air) having passed through the evaporator 9 by using coolant (hot water), which is used for cooling the engine, as a heat source.

A bypass passage 16 is provided at one side of the heater core 15 so that air having passed through the evaporator 9 bypasses the heater core 15 through the bypass passage 16. Thus, temperature of the air mixed at downstream sides of the heater core 15 and the bypass passage 16 changes depending on a ratio between an air flow amount flowing through the heater core 15 and an air flow amount flowing the bypass passage 16.

Thus, in the present embodiment, an air mix door 17 is arranged between the downstream side of the evaporator 9 and an upstream side of the heater core 15 and the bypass passage 16. The air mix door 17 continuously changes the ratio between the air flow amounts of the heater core 15 and the bypass passage 16. Hence, the air mix door 17 is adopted as a temperature adjusting portion, which adjusts the temperature of the air mixed in an air mixing portion at the downstream side of the heater core 15 and the bypass passage 16.

The air mix door 17 is driven by a servomotor 18 which is controlled by a control signal output from the air conditioning controller 30.

At the most downstream side of the casing 2, air outlets 19 to 21 are provided. Conditioned air having been temperature-adjusted is blown from the air outlets 19 to 21 into the vehicle compartment that is a space to be air-conditioned. Specifically, the air outlets 19 to 21 are a defroster air outlet 19, a face air outlet 20 and a foot air outlet 21. The defroster air outlet 19 is provided to blow conditioned air toward an inner surface of a windshield W of the vehicle. The face air outlet 20 is provided to blow conditioned air toward an upper side of a passenger seated on a seat of the vehicle compartment. The foot air outlet 21 is provided to blow conditioned air toward a lower side of the passenger seated on the seat of the vehicle compartment.

A defroster door 22, a face door 23, and a foot door 24 are provided at upstream sides of the defroster air outlet 19, the face air outlet 20 and the foot air outlet 21 in the air flow direction respectively, thereby regulating open areas of the corresponding air outlets 19 to 21.

The defroster door 22, the lace door 23 and the foot door 24 are adopted as an example of an outlet mode switching portion which switches an air outlet mode. These three doors 22, 23, 24 are coupled to a servomotor 25 through a non-illustrated link mechanism, thereby being operated rotationally and integrally. An operation of the servomotor 25 is also controlled by a control signal output from the air conditioning controller 30.

The air outlet mode includes a face mode, a bi-level mode, a foot mode and a foot/defroster mode. In the face mode, the face air outlet 20 is fully opened so that conditioned air is blown toward the upper side of the passenger in the vehicle compartment from the face air outlet 20. In the bi-level mode, both the face air outlet 20 and the foot air outlet 21 are opened so that conditioned air is blown toward the upper and lower sides of the passenger in the vehicle compartment. In the foot mode, the foot air outlet 21 is fully opened and the defroster air outlet 19 is opened by a small open degree so that conditioned air is mainly blown from the foot air outlet 21. In the foot/defroster mode, the foot air outlet 21 and the defroster air outlet 19 are opened by approximately same open degree so that conditioned air is blown from both the foot air outlet 21 and the defroster air outlet 19.

Furthermore, as the air outlet mode, a defroster mode can be set, in which the defroster air outlet 19 is fully opened so that conditioned air is blown toward the inner surface of the windshield of the vehicle from the defroster air outlet 19, when the passenger manually controls switches of an operation panel 50.

An electrical control portion of the present embodiment will be described below. The air conditioning controller 30 includes a known microcomputer and its peripheral circuit. The microcomputer includes a central processing unit (CPU), a read-only memory (ROM), and a random-access memory (RAM). The air conditioning controller 30 performs a variety of calculations and processes based on an air conditioning control program stored in the ROM, and controls operations of various devices connected to an output side of the air conditioning controller 30.

The output side of the air conditioning controller 30 is connected to air conditioning control devices such as the servomotors 7, 18, and 25, the electrical motor 8b, the inverter 40 for the electrical motor 11b, and the electrical motor 12c.

An input side of the air conditioning controller 30 is connected to a sensor group, which is used for controlling air conditioning. The sensor group includes an outside air sensor 31, an inside air sensor 32, a solar sensor 33, an evaporator temperature sensor 34 (cooling temperature detector), a coolant temperature sensor 35, and a dew-point detector 36. The outside air sensor 31 detects an outside air temperature Tam, and the inside air sensor 32 detects an inside air temperature Tr of the vehicle compartment. The solar sensor 33 detects a solar radiation amount Ts entering into the vehicle compartment, and the evaporator temperature sensor 34 detects a temperature Te (cooling temperature of the blown air) of air immediately after flowing out of the evaporator 9. The coolant temperature sensor 35 detects a temperature Tw of coolant flowing out from the engine, and the dew-point detector 36 detects a dew-point temperature Tdew of air flowing into the evaporator 9.

For example, the evaporator temperature sensor 34 of the present embodiment detects a temperature of a fin in a heat exchanging portion of the evaporator 9. As the evaporator temperature sensor 34, a temperature detector may be adopted, which detects a temperature of another part of the evaporator 9, or which directly detects a temperature of refrigerant flowing in the evaporator 9. Furthermore, a temperature detector, which detects a temperature of air immediately after flowing out of the evaporator 9, also may be adopted.

The dew-point detector 36 of the present embodiment may be configured to include a humidity sensor which detects a relative humidity Rein of air flowing into the evaporator 9, and a temperature sensor which detects a temperature Tein of air flowing into the evaporator 9. The humidity sensor and the temperature sensor may be incorporated into the dew-point detector 36 to output a relative humidity Rein and a temperature Tein of air flowing into the evaporator 9.

The relative humidity Rein and the temperature Tein of air flowing into the evaporator 9 are examples of physical amounts relevant to the dew-point temperature Tdew of air flowing into the evaporator 9. A humidity sensor and a temperature sensor, which are separately provided, may be adopted to detect the physical amounts without using the dew-point detector 36. In this case, the air conditioning controller 30 calculates the dew-point temperature Tdew based on detection values of the humidity sensor and the temperature sensor.

Additionally, the input side of the air conditioning controller 30 is connected to the operation panel 50 arranged near the instrument panel located at the front end of the vehicle compartment. Operation signals output from various air-conditioning operation switches provided at the operation panel 50 are input to the input side of air conditioning controller 30.

Specifically, the air-conditioning operation switches provided at the operation panel 50 includes an air-conditioner switch 51, a temperature setting switch 52, an air outlet mode switch 53, an inside/outside air selecting switch 54, a blower operation switch 55, an automation switch 56. The air-conditioner switch 51 is used for outputting an operation command signal of the compressor 11, the temperature setting switch 52 is used as an example of a temperature setting portion which sets a temperature Tset of the vehicle compartment. The air outlet mode switch 53 is used for manually setting the air outlet mode which is switched by selectively opening and closing the air outlet doors 22 to 24. The inside/outside air selecting switch 54 is used for manually setting the air inlet mode which is switched by selectively opening and closing the inside/outside air switching door 6. The blower operation switch 55 is used for manually changing an air blowing amount of the blower 8, and the automation switch 56 is used for performing or terminating an automatic control of the air conditioner 100.

The air conditioning controller 30 is configured to include control portions which control the above-described air conditioning control components 7, 8b, 12c, 18, 25, and 40. In the present embodiment, for example, a cooling temperature control portion 30a is adopted as a control portion (a hardware and a software), which controls the operation of the electrical motor 11b (specifically, the inverter 40) of the compressor 11 adopted as the cooling temperature adjusting portion. An inside/outside air switch control portion 30b is adopted as a control portion (a hardware and a software), which controls the servomotor 7 of the switching door 6 of the inside/outside air switching portion (5).

Figure 2:
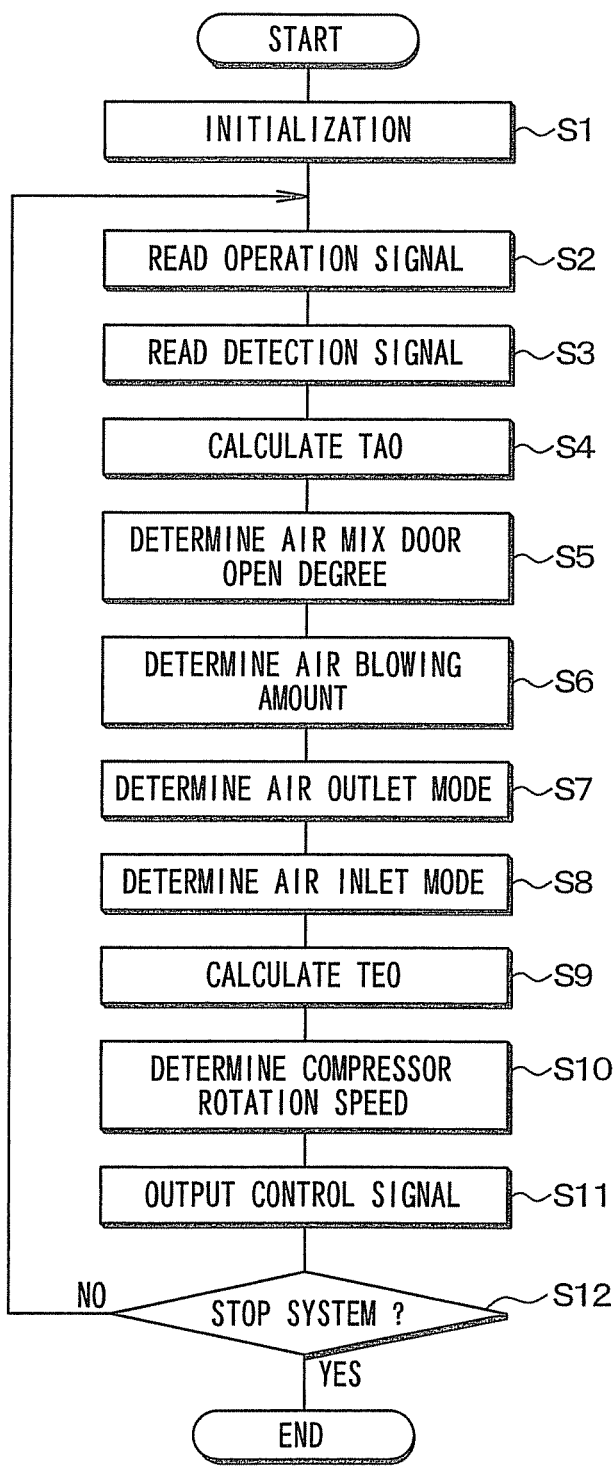
FIG. 2 is a flowchart showing a control process of the air conditioner according to the first embodiment and other embodiments.
Figure 3:
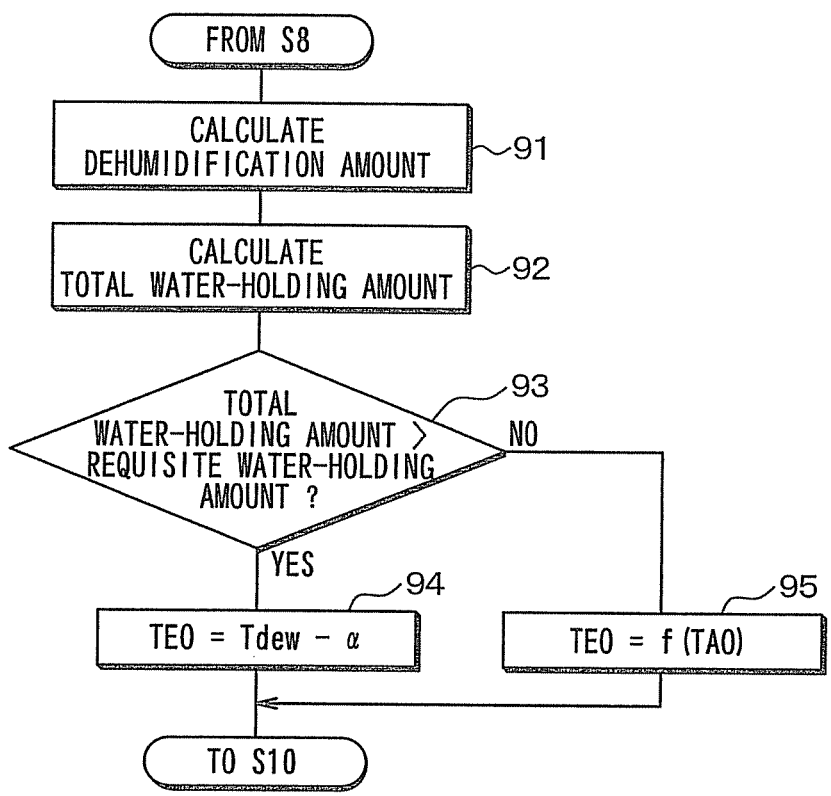
FIG. 3 is a flowchart showing a part of the control process of the air conditioner according to the first embodiment and other embodiments.

An operation of the air conditioner 100 will be described referring to FIGS. 2 and 3. Each of control steps in FIGS. 2 and 3 is a part of an implementation portion of various functions of the air conditioning controller 30. The control process starts when the automation switch 56 is switched ON in a state where the air-conditioner switch 51 of the operation panel 50 is switched ON.

At step S1, initialization of a flag, a timer, and the like is performed. In the initialization, some of flags and calculated values, which are stored at the last termination of a control operation of the air conditioner 100, are maintained. At step S2, operation signals from the operation panel 50 are read in, and next at step S3, signals of a vehicle-environmental state such as detection signals of the sensor group 31 to 36 and the like are input.

At step S4, a target outlet air temperature TAO of air blown into the vehicle compartment is calculated. The target outlet air temperature TAO is calculated by using the following formula F1.

$$TAO = Kset \times Tset - Kr \times Tr - Kam \times Tam - Ks \times Ts + C \quad (F1)$$

Here, Tset is a set temperature of the vehicle compartment set by the temperature setting switch 52, Tr is a temperature inside the vehicle compartment (inside air temperature) detected by the inside air sensor 32, Tam is a temperature outside the vehicle compartment (outside air temperature) detected by the outside air sensor 31, and Ts is a solar radiation amount detected by the solar sensor 33. Furthermore, Kset, Kr, Kam and Ks are gains, and C is a constant value for a correction.

At subsequent steps S5 to S10, control states of the various devices connected to the air conditioning controller 30 are determined. At step S5, a target open degree SW of the air mix door 17 (e.g., a control signal output from the air conditioning controller 30 to the servomotor 18 of the air mix door 17) is calculated based on the target outlet air temperature TAO, the air temperature Te detected by the evaporator temperature sensor 34, and a coolant temperature Tw detected by the coolant temperature sensor 35, by using the following formula F2.

$$SW = [(TAO - Te)/(Tw - Te)] \times 100(\%) \quad (F2)$$

SW=0(%) indicates that the air mix door 17 is in a maximum cooling state, where the bypass passage 16 is fully opened and a heating air passage through which air passes through the heater core 15 is fully closed. In contrast, SW=100(%) indicates that the air mix door is in a maximum heating state, where the bypass passage 16 is fully closed and the heating air passage is fully opened.

At step S6, an air blowing amount blown by the blower 8 (e.g., a control voltage output from the air conditioning controller 30 to the electrical motor 8a) is determined. The control voltage is determined based on the target outlet air temperature TAO, so as to be larger voltage in a high or low TAO relative to in a middle TAO, based on a control map which is preliminarily stored in the air conditioning controller 30.

At step S7, the air outlet mode is determined. The air outlet mode is determined also based on the target outlet air temperature TAO by using a control map stored in the air conditioning controller 30. In the present embodiment, the air outlet mode is switched from the foot mode to bi-level (B/L) mode, and then to the face mode, as the TAO increases from a low to high temperature region.

At step S8, the air inlet mode is determined by setting a switching state of the inside/outside air switching box 5. The air inlet mode is determined also based on the TAO by using a control map stored in the air conditioning controller 30. In the present embodiment, the outside air mode is generally preferentially set, where outside air is introduced. However, the inside air mode, where inside air is introduced, is selected when the TAO becomes extremely low temperature, i.e., when high cooling performance is required.

At step S9, the target cooling temperature TEO of air blown out of the evaporator 9 is determined. The control operation of step S9 of the present embodiment is adopted as a target temperature determining portion for determining a target cooling temperature TEO which is a target value of a cooling temperature Te of air in the evaporator 9.

Details of the control operation of step S9 will be described referring to FIG. 3.

At step S91, a dehumidification amount dW per control cycle at the evaporator 9 is calculated by using a detection value from the dew-point detector 36, which is read at step S3 (e.g., the relative humidity Rein and the temperature Tein), and by using an air blowing amount Ga corresponding to a control voltage of the first electrical motor 8b, which is determined at step S6.

Specifically, the dehumidification amount dW is calculated by using the following formula F3.

$$dW = Ga \times (Xin - Xout) \quad (F3)$$

Here, Xin of the formula F3 is a specific humidity (inlet specific humidity) of air flowing at an air inlet of the evaporator 9, and Xout is a specific humidity (outlet specific humidity) of air flowing at the air outlet of the evaporator 9. The inlet specific humidity Xin is calculated from a value detected by the dew-point detector 36. The outlet specific humidity Xout is calculated by assuming that a relative humidity of air flowing at the air outlet is 100% and a temperature of air flowing at the air outlet of the evaporator 9 is the air temperature Te (cooling temperature of air).

Next at step S92, a present total water-holding amount W at an outer surface of the evaporator 9 is calculated by adding the dehumidification amount dW calculated at step S91 to a water-holding amount W_old at the outer surface of the evaporator 9 calculated last time. The control operation of step S92 is adopted as an example of a water-holding amount calculation portion, which calculates a water-holding amount at the outer surface of the evaporator 9 based on the dehumidification amount dW.

At step S92, the calculated total water-holding amount W is stored in the storage portion (e.g., RAM) as a water-holding amount W_old. The total water-holding amount W of the present embodiment is initialized (e.g., W=0) at step S1 at a start of air conditioning.

Next at step S93, it is determined whether a moistness condition is satisfied. Here, the moistness condition is satisfied when a water-holding amount of dew condensation water at the outer surface of the evaporator 9 exceeds a standard amount. Specifically, it is determined whether the total water-holding amount W calculated at step S92 is larger than a predetermined requisite water-holding amount (standard amount).

The requisite water-holding amount is a water-holding amount necessary for keeping the outer surface of the evaporator 9 at a moist state (for preventing the outer surface from drying) even when dew condensation water at the outer surface of the evaporator 9 evaporates by the largest evaporation amount. The largest evaporation amount is estimated depending on the dew-point temperature Tdew of air flowing into the casing 2. The requisite water-holding amount is determined by an experiment or a simulation in advance.

At step S93, when the total water-holding amount W of the outer surface of the evaporator 9 is determined to be larger than the requisite water-holding amount, namely, when the moistness condition is satisfied, a control operation of step S94 is performed.

In this case, it can be determined that the outer surface of the evaporator 9 has a water-holding amount sufficiently and thereby is difficult to be dry. Hence, at step S94, the target cooling temperature TEO of air flowing at the air outlet of the evaporator 9 is determined to be a first target temperature lower than the dew-point temperature Tdew by a standard degree α. Specifically, the target cooling temperature TEO (TEO=Tdew−α) is determined by subtracting a predetermined standard degree α from a dew-point temperature Tdew detected by the dew-point detector 36. The standard degree α is a margin of error, and is set to be 2° C., for example.

At step S93, when the total water-holding amount W of the outer surface of the evaporator 9 is determined to be equal to or smaller than the requisite water-holding amount, namely, when the moistness condition is not satisfied, a control operation of step S95 is performed.

In this case, it can be determined that the outer surface of the evaporator 9 has a little water-holding amount and thereby is easy to be dry. Thus, at step S95, the target cooling temperature TEO of air flowing at the air outlet of the evaporator 9 is determined to be a second target temperature lower than the first target temperature, based on the target outlet air temperature TAO by using a control map stored in the air conditioning controller 30. Here, the target outlet air temperature TAO has been determined at step S4.

Accordingly, the water-holding amount W of dew condensation water at the outer surface of the evaporator 9 can be increased by setting the target cooling temperature TEO at the second target temperature calculated based on the target outlet air temperature TAO when the water-holding amount W of dew condensation water at the outer surface is small.

At step S10, a rotation speed (a control voltage output from the inverter 40 to the electrical motor 11*b* of the compressor 11, i.e., a refrigerant discharge capacity of the compressor 11 is determined. Specifically, a deviation En (En=Te−TEO) between the air temperature Te and the target cooling temperature TEO determined at step S9 is calculated at first. And then, based on the calculated deviation En, a control voltage output from the inverter 40 is determined by a feedback control method using a proportional-integral control (PI control), so that the air temperature Te approaches the target cooling temperature TEO.

In the air conditioner 100 of the present embodiment, the cooling temperature control portion 30*a* of the air conditioning controller 30 controls an operation of the compressor 11, so that the air temperature Te (air temperature cooled by the evaporator 9) approaches a target cooling temperature TEO. In the present embodiment, the lowest temperature of the target cooling temperature TEO is set to be equal to or larger than 0° C. (e.g., the lowest temperature is set to be 1° C.), so that frost formation at the evaporator 9 is prevented.

At step S11, control signals or the like are output from the air conditioning controller 30 to the air conditioning control components 7, 8*b*, 12*c*, 18, 25, and 40, so that the control states determined at above-described steps S5 to S10 are set. Next at step S12, it is determined whether a termination signal for stopping the operation of the air conditioner 100 is output from the operation panel 50.

When the termination signal is determined to be output at step S12, the operation of the air conditioner 100 is stopped. When the termination signal is determined not to be output, the operation waits for a control period τ (e.g., about 250 ms), and after a determination of the elapse of control period τ, the operation returns to step S2.

Because the air conditioner 100 according to the present embodiment is operated as described above, refrigerant evaporates in the evaporator 9 by absorbing heat from air blown from the blower 8, thereby cooling air blown from the blower 8. Cold air cooled by the evaporator 9 flows into the heating air passage of the heater core 15 and/or the bypass passage 16 depending on an open state of the air mix door 17.

Cold air flowing into the heating air passage is reheated at the heater core 15, and then mixed with cold air which passes through the bypass passage 16 while bypassing the heater core 15, so that temperature of air is conditioned. The conditioned air is blown into the vehicle compartment through the air outlets 19 to 21. Accordingly, when the inside air temperature Tr in the vehicle compartment becomes lower than the outside air temperature Tam, cooling of the vehicle compartment can be performed. On the other hand, when the inside air temperature Tr in the vehicle compartment becomes higher than an outside air temperature Tam, heating of the vehicle compartment can be performed.

In the air conditioner 100 of the present embodiment, at step S9, the target cooling temperature TEO is determined to be the second target temperature that is lower than the first target temperature calculated depending on the dew-point temperature Tdew when the outer surface of the evaporator 9 has a lithe water-holding amount. Here, step S9 is adopted as an example of the target temperature determining portion.

A control operation of step S9 will be described referring to FIG. 4.

Figure 4:
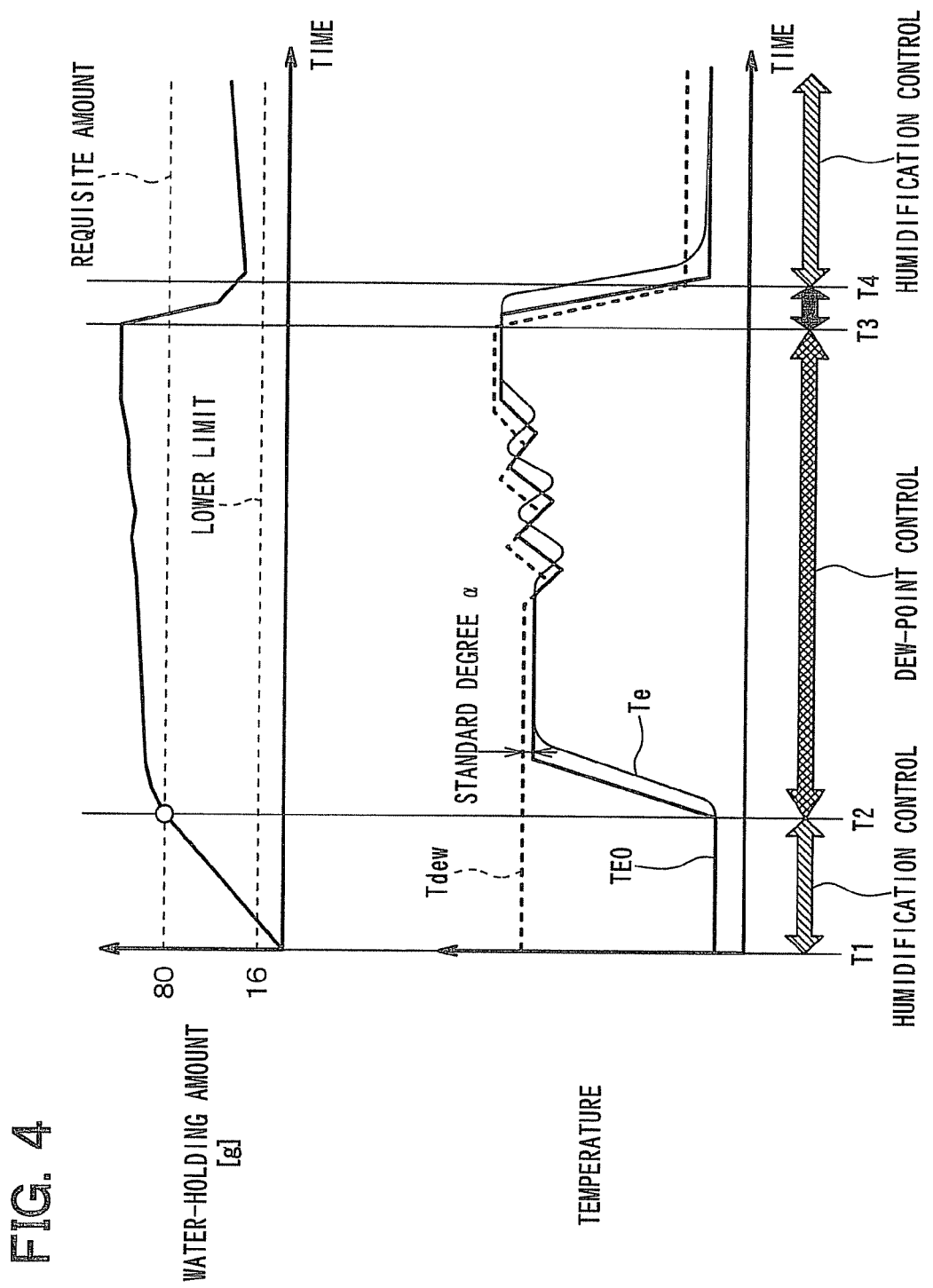
FIG. 4 is a timing chart showing a characteristic operation of the air conditioner according to the first embodiment.

FIG. 4 is a time chart showing a water-holding amount W on the outer surface of the evaporator 9, the target cooling temperature TEO and the dew-point temperature Tdew of air blown out of the evaporator 9 in a cooling operation for cooling the vehicle compartment. In the present embodiment, air conditioning of the vehicle compartment starts when the water-holding amount W of the outer surface of the evaporator 9 is lower than a lower limit water-holding amount. The lower limit water-holding amount is a limit amount below which bad odor may be generated in the air.

At a start time T1 of air conditioning of the vehicle compartment, the water-holding amount W at the outer surface of the evaporator 9 is lower than the requisite water-holding amount. Thus, if the target cooling temperature TEO increases to around the dew-point temperature Tdew, the outer surface of the evaporator 9 may become dry. Hence, the target cooling temperature TEO is set at the second target temperature which is based on the target outlet air temperature TAO. Because the second target temperature is lower than the first target temperature which is based on the dew-point temperature Tdew, the dehumidification amount of air flowing into the evaporator 9 increases. Therefore, the water-holding amount W at the outer surface increases.

The water-holding amount W of the outer surface of the evaporator 9 exceeds the requisite water-holding amount at time T2. After this, the outer surface of the evaporator 9 can be kept at a moist state even if the target cooling temperature TEO increases to near the dew-point temperature Tdew. Therefore, the target cooling temperature TEO is determined to be a temperature lower than the dew-point temperature Tdew by the standard degree a, namely, to be the first target temperature which is based on the dew-point temperature Tdew.

The target cooling temperature TEO is determined to be the first target temperature which is based on the dew-point temperature Tdew in a time period before T3. However, when the dew-point temperature Tdew reduces drastically at time T3 to T4 due to, for example, opening and closing of a window of the vehicle, the target cooling temperature TEO and the actual air temperature Te exceed the dew-point temperature Tdew because of response lag of a control operation or the like.

In this case, it is concerned that the outer surface of the evaporator 9 may become dry. But here, the outer surface is moist enough because of the moisture supply at the start of air conditioning of the vehicle compartment. Therefore, the water-holding amount W on the outer surface of the evaporator 9 can be prevented from being lower than the lower limit water-holding amount.

When the water-holding amount W of the outer surface of the evaporator 9 becomes lower than the lower limit water-holding amount by the drastic reduction of the dew-point temperature Tdew, the target cooling temperature TEO is determined to be the second target temperature which is based on the target outlet air temperature TAO. Accordingly, the dehumidification amount of air flowing into the evaporator 9 increases, and thereby the water-holding amount W of the outer surface of the evaporator 9 increases again.

The control operation performed between time T1 and time T2, and performed after time T4 in FIG. 4, is a humidification control operation where the target cooling temperature TEO is determined to be the second target temperature. The control operation performed between time T2 and T3 is a dew-point control operation where the target cooling temperature TEO is determined to be the first target temperature.

As described above, in the present embodiment, the target cooling temperature TEO is determined to be the second target temperature that is lower than the first target temperature when the water-holding amount W of the outer surface of the evaporator 9 is small at an air-conditioning start or the like and when the outer surface of the evaporator 9 is easy to be dry. Thus, the water-holding amount W of the outer surface of the evaporator 9 can be increased, and the outer surface of the evaporator 9 can be kept at a moist state as compared to a case where the target cooling temperature TEO is always determined to be the first target temperature.

Moreover, the target cooling temperature TEO is determined to be the second target temperature lower than the first target temperature temporarily when the water-holding amount W of the outer surface of the evaporator 9 is small. Hence, consumed energy of the whole air conditioner 100 (e.g., consumed driving power of the compressor 11 in the present embodiment) can be prevented from increasing, as compared to a case where the target cooling temperature TEO is always determined to be the second target temperature.

Therefore, bad odor generation in air blown into the vehicle compartment can be prevented with reducing energy consumption of the air conditioner 100.

(Second Embodiment)

A second embodiment of the invention will be described. In the second embodiment, the target cooling temperature TEO is determined to be the second target temperature lower than the first target temperature, until when a predetermined base time elapses after air conditioning of the vehicle compartment starts.

Specifically, at step S9 in FIG. 2, the base time is determined at an air-conditioning start at first. The base time is a time period where the target cooling temperature TEO is set to be lower than the first target temperature. The base time is determined based on a control map showing a relationship between the specific humidity (inlet specific humidity) of air flowing at the inlet of the evaporator 9, the target outlet air temperature TAO, and the base time.

The target cooling temperature TEO is determined to be the second target temperature which is based on the target outlet air temperature TAO until the base time elapses after air conditioning of the vehicle compartment starts. The second target temperature is lower than the first target temperature which is based on the dew-point temperature Tdew. Accordingly, the water-holding amount W of the outer surface of the evaporator 9 increases until the base time elapses after the start of air-conditioning.

The target cooling temperature TEO is determined to be the first target temperature, which is based on the dew-point temperature Tdew, when the base time elapses after the air-conditioning start. Accordingly, the outer surface of the evaporator 9 can be maintained at a moist state even if the target cooling temperature TEO is increased to near the dew-point temperature Tdew.

According to the above, the outer surface of the evaporator 9 can be prevented from becoming dry even if the dew-point temperature Tdew of air flowing into the evaporator 9 drastically reduces during air conditioning of the vehicle compartment, because the water-holding amount W of the outer surface increases enough until the base time elapses after a start of the air-conditioning.

The target cooling temperature TEO is determined to be the second target temperature lower than the first target temperature before the base time elapses after a start of air-conditioning. Hence, energy consumption of the whole air conditioner 100 can be reduced as compared to the case where the target cooling temperature TEO is always determined to be the second target temperature.

Therefore, bad odor generation in air blown into the vehicle compartment is prevented with preventing energy consumption of the air conditioner 100 from increasing.

In the present embodiment, the water-holding amount W of the outer surface of the evaporator 9 does not need to be calculated at step S9 every control cycle. Thus, a calculation load on the CPU in the air conditioning controller 30 can be reduced.

In the second embodiment, the other parts may be similar to those of the above-described first embodiment.

(Third Embodiment)

A third embodiment of the invention will be described. In the third embodiment, the second target temperature lower than the first target temperature which is based on the dew-point temperature Tdew is set to be the lowest degree of the target cooling temperature TEO (e.g., 1° C.).

Even when the second target temperature is set to be the lowest degree above which frost is not formed at the evaporator 9, bad odor generation in air blown into the vehicle compartment is prevented with reducing energy consumption of the air conditioner 100, similar to the first and second embodiments.

In the present embodiment, the water-holding amount W of the outer surface of the evaporator 9 can be increased for a short time. Thus, a time period, where the target cooling temperature TEO is determined to be the second target temperature lower than the first target temperature, can be shortened. Consequently, prevention of increment of energy consumption of the air conditioner can be more effectively provided.

(Other Embodiments)

The invention is not limited to the above-described embodiments. Unless departing the scope described in each claim, the invention is not limited to the tenor described in each claim. The invention extends into a scope where a person skilled in the art can substitute easily. A refinement based on knowledge, that a person skilled in the art generally has, can be added arbitrarily to the invention. For example, the invention can be modified variously as below.

(1) In the above-described embodiments, the temperature calculated based on the target outlet air temperature TAO or the lowest degree of the target cooling temperature TEO is adopted as the second target temperature lower than the first target temperature which is based on the dew-point temperature Tdew. However, an arbitrary temperature, which is lower than the first temperature, may be adopted as the second target temperature. For example, a temperature, which is calculated by subtracting a degree larger than the standard degree a from the dew-point temperature Tdew, can be adopted as the second target temperature.

(2) As with the above-described embodiments, it is preferable that the target cooling temperature TEO is set as the second target temperature lower than the first target temperature which is based on the dew-point temperature Tdew in the situation where the water-holding amount W of the outer surface of the evaporator 9 is easy to decrease. However, the target cooling temperature TEO may be set as the second target temperature at an arbitrary timing. Moreover, the target cooling temperature TEO may be set as the second target temperature at least one time from a start to the end of air conditioning.

(3) In the above-described embodiments, the first target temperature is updated depending on the dew-point temperature Tdew every control cycle, but it is not limited to this. For example, when the air inlet mode is set to be the inside air mode where inside air (air inside the vehicle compartment) is introduced into the casing 2, air which is dehumidified by the evaporator 9 circulates. Thus, the dew-point temperature Tdew of air flowing into the evaporator 9 decreases, and thereby the first target temperature of the evaporator 9 also decreases gradually. Accordingly, air cooled by the evaporator 9 may be cooled much unnecessarily.

Therefore, when a predetermined time elapses after the inside air mode is selected, updating of the first target temperature may stop, and a first target temperature calculated before the stop may be kept. Accordingly, air cooled by the evaporator 9 can be prevented from being cooled much unnecessarily. Consequently, energy consumption of the air conditioner can be reduced.

(4) In the above-described embodiments, the first target temperature is set to be the temperature lower than the dew-point temperature Tdew by the standard degree α. However, the standard degree a may be a fixed value or a variable value. When the variable value is adopted as the standard degree α, the standard degree α may be determined, for example, based on the temperature Tein and the humidity Rein of air flowing into the evaporator 9, by using a control map showing a relationship between the temperature Tein, the humidity Rein, and the standard degree α.

When the air inlet mode is set to be the inside air mode, the dew-point temperature Tdew of air flowing into the evaporator 9 may be much affected by breathing and sweating of a passenger. Hence, the standard degree a may be determined depending on the number of passengers on the vehicle.

In this case, a humidification amount in the vehicle compartment increases with increasing the number of passengers. Thus, the standard degree α' is set to increase with increasing the number of passengers. For example, when the number of passengers is large (e.g., 5 passengers), the standard degree α' is set to be high relative to when the number of passengers is small (e.g., 1 passenger). Therefore, when the number of passengers is large, the target cooling temperature TEO is set to be low relative to when the number of passengers is small.

Accordingly, the target cooling temperature TEO can be determined based not only on the dew-point temperature Tdew of air flowing into the evaporator 9 but also on the standard degree α' in the inside air mode. Here, the standard degree α' is determined based on a humidity change in the vehicle compartment. Therefore, the vehicle compartment can be prevented from being dehumidified excessively.

The number of passengers on the vehicle can be estimated based on a signal from a seating sensor or a seat belt sensor or the like. The seating sensor is embedded in a seat of the vehicle and detects whether a passenger sits on the seat. The seat belt sensor detects whether a seat belt is fastened or not.

(5) In the above-described embodiments, a total water-holding amount W calculated at step S9 is initialized (W=0) at a start of air conditioning of the vehicle compartment at step S1, but it is not limited to this. For example, a total water-holding amount W calculated at a last stop of air conditioning of the vehicle compartment may be stored as a W_old, and the W_old may be used as a total water-holding amount W for a next air conditioning.

In a case where a time period from stop to restart of air conditioning of the vehicle compartment is long, the water-holding amount W of the outer surface of the evaporator 9 may reduce. Thus, a total water-holding amount W calculated at a last stop of air conditioning of the vehicle compartment may be stored as a W_old at first. Next, the W_old may be reduced depending on the period from stop to restart of air conditioning, and then the reduced W_old may be used as a total water-holding amount W for a next air conditioning.

(6) In the above-described second embodiment, the target cooling temperature TEO is determined to be the second target temperature lower than the first target temperature which is based on the dew-point temperature Tdew until the predetermined base time elapses after a start of air conditioning of the vehicle. However, the water-holding amount W of the outer surface of the evaporator 9 may be calculated after the predetermined base time elapses. When the calculated water-holding amount W becomes lower than the requisite water-holding amount, the target cooling temperature TEO may be determined to be the second target temperature lower than the first target temperature.

(7) In the above-described embodiments, the compressor 11 is adopted as the cooling temperature adjusting portion, but the cooling temperature adjusting portion is not limited to this. A variable throttle mechanism used as the decompression portion of the refrigerant cycle 10 can be adopted as the cooling temperature adjusting portion, when the evaporator 9 of the refrigerant cycle 10 is adopted as the cooling heat exchanger as with the above-described embodiments. In this case, the evaporation temperature of refrigerant flowing at the evaporator 9, i.e., the cooling temperature can be adjusted by regulating an open degree of the variable throttle mechanism.

(8) In the above-described embodiments, the evaporator 9 of the refrigerant cycle 10 is adopted as the cooling heat exchanger, but the cooling heat exchanger is not limited to this. For example, an evaporator which evaporates refrigerant (heat medium) in an adsorption refrigerator or an absorption refrigerator may be adopted as the cooling heat exchanger. A heat exchanger having a Peltier module, which exerts cooling performance by Peltier effect, may be also adopted as the cooling heat exchanger.

Additional advantages and modifications will readily occur to those skilled in the art. The invention in its broader terms is therefore not limited to the specific details, representative apparatus, and illustrative examples shown and described.

What is claimed is:
1. An air conditioner for a vehicle, comprising:
a casing defining an air passage through which air to be blown into a vehicle compartment passes;
a cooling heat exchanger arranged in the casing to cool air;
a cooling temperature adjusting portion configured to adjust a cooling temperature of air cooled at the cooling heat exchanger, the cooling temperature adjusting portion including a compressor;
a dew-point detector configured to detect a physical amount relevant to a dew-point temperature of air flowing to the cooling heat exchanger;
a target temperature determining portion configured to determine a target cooling temperature that is a target temperature of the cooling heat exchanger;
a cooling temperature control portion configured to control the cooling temperature adjusting portion so that the cooling temperature approaches the target cooling temperature;
a cooling temperature detector configured to detect a temperature of air immediately after flowing out of the cooling heat exchanger; and
a water-holding amount calculation portion configured to calculate a water-holding amount of an outer surface of the cooling heat exchanger based on an inlet humidity calculated from a detection value of the dew-point detector and an outlet humidity calculated from a detection value of the cooling temperature detector, wherein the water-holding amount calculation portion calculates the water-holding amount by accumulating over time a dehumidified amount that is calculated by subtracting the outlet humidity from the inlet humidity, wherein:
a standard water-holding amount is set to be larger than a largest evaporation amount of dew condensation water on the outer surface of the cooling heat exchanger, the largest evaporation amount being estimated depending on change in dew-point temperature of air flowing into the casing by an experiment or a simulation in advance;
the target temperature determining portion determines the target cooling temperature to be one of a first target temperature lower than the dew-point temperature by a standard temperature amount and a second target temperature lower than the first target temperature;
the target temperature determining portion switches the target cooling temperature between the first target temperature and the second target temperature based on one or more conditions;
the target temperature determining portion determines the target cooling temperature as the first target temperature when the water-holding amount is higher than the standard water-holding amount;
the target temperature determining portion determines the target cooling temperature as the second target temperature when the water-holding amount is lower than or equal to the standard water-holding amount; and
wherein the compressor rotation speed is determined based upon the determined target cooling temperature.

2. The air conditioner according to claim 1, wherein the temperature determining portion determines the target cooling temperature to be the second target temperature at least one time, until a base time elapses after air conditioning of the vehicle compartment starts.

3. The air conditioner according to claim 1, wherein the target temperature of the cooling heat exchanger is a target temperature of air blown across the cooling heat exchanger.

4. The air conditioner according to claim 1, wherein the water-holding amount is an amount necessary for keeping an outer surface of the cooling heat exchanger in a moist state.

5. The air conditioner according to claim 1, wherein the water-holding amount calculation portion calculates the water-holding amount by adding the dehumidified amount to a water-holding amount calculated by the water-holding amount calculation portion a previous time period.

6. The air conditioner according to claim 1, wherein the water-holding amount calculation portion sets the water-holding amount to zero at a start of air conditioning.

7. The air conditioner according to claim 1, wherein the water-holding amount calculation portion calculates the water-holding amount by using a previous water-holding amount that is a water-holding amount calculated by the water-holding amount calculation portion at a last stop of air conditioning.

8. The air conditioner according to claim 7, wherein the water-holding amount calculation portion reduces the previous water-holding amount with time elapsing from the last stop of air conditioning to a restart of air conditioning.

9. The air conditioner according to claim 1, wherein the second target temperature is set at a lowest degree in a temperature range where frost is not formed on the cooling heat exchanger.

10. The air conditioner according to claim 1, wherein the target temperature determining portion determines the standard temperature difference between the dew-point temperature and the first target temperature to be a variable value determined based on a temperature and a humidity of air flowing into the cooling heat exchanger.

11. The air conditioner according to claim 1, wherein the target temperature determining portion determines the standard temperature difference between the dew-point temperature and the first target temperature to be a variable value determined based on a number of occupants in the vehicle.

12. The air conditioner according to claim 11, wherein the target temperature determining portion determines the standard temperature difference to increase in accordance with increase in the number of occupants in the vehicle.

* * * * *